(12) United States Patent
Wolfram

(10) Patent No.: US 8,657,078 B2
(45) Date of Patent: Feb. 25, 2014

(54) WHEEL CHOCK

(76) Inventor: Stephen D. Wolfram, Savannah, MO (US)

( * ) Notice: Subject to any disclaimer, the term of this patent is extended or adjusted under 35 U.S.C. 154(b) by 0 days.

(21) Appl. No.: 12/653,227

(22) Filed: Dec. 10, 2009

(65) Prior Publication Data

US 2010/0140024 A1 Jun. 10, 2010

Related U.S. Application Data

(63) Continuation of application No. 11/797,920, filed on May 9, 2007, now abandoned.

(51) Int. Cl.
*B61H 13/00* (2006.01)
*B60T 1/14* (2006.01)

(52) U.S. Cl.
USPC .............................. 188/36; 188/4 R; D12/217

(58) Field of Classification Search
USPC .................... 188/4 R, 5, 32, 36, 35; D12/217
See application file for complete search history.

(56) References Cited

U.S. PATENT DOCUMENTS

| | | | | |
|---|---|---|---|---|
| D206,447 S | * | 12/1966 | Switzer | D12/217 |
| 5,685,397 A | * | 11/1997 | Maddox et al. | 188/36 |
| 5,727,658 A | * | 3/1998 | Petrzelka | 188/36 |
| D552,527 S | * | 10/2007 | Wolfram | D12/217 |
| 2003/0113905 A1 | * | 6/2003 | Ho et al. | 435/287.1 |
| 2003/0159892 A1 | * | 8/2003 | Jette | 188/32 |
| 2005/0089368 A1 | * | 4/2005 | Crowley, Sr. | 404/6 |

* cited by examiner

*Primary Examiner* — Melody M Burch

(57) ABSTRACT

A wheel chock including a head for engagement with a vehicle wheel. The head has a blade that defines a pair of conjoined wedges oriented 180° apart. A hosel is affixed to, and extends laterally from, the middle of the blade. A handle is affixed to, and extends upwardly from, the hosel.

1 Claim, 2 Drawing Sheets

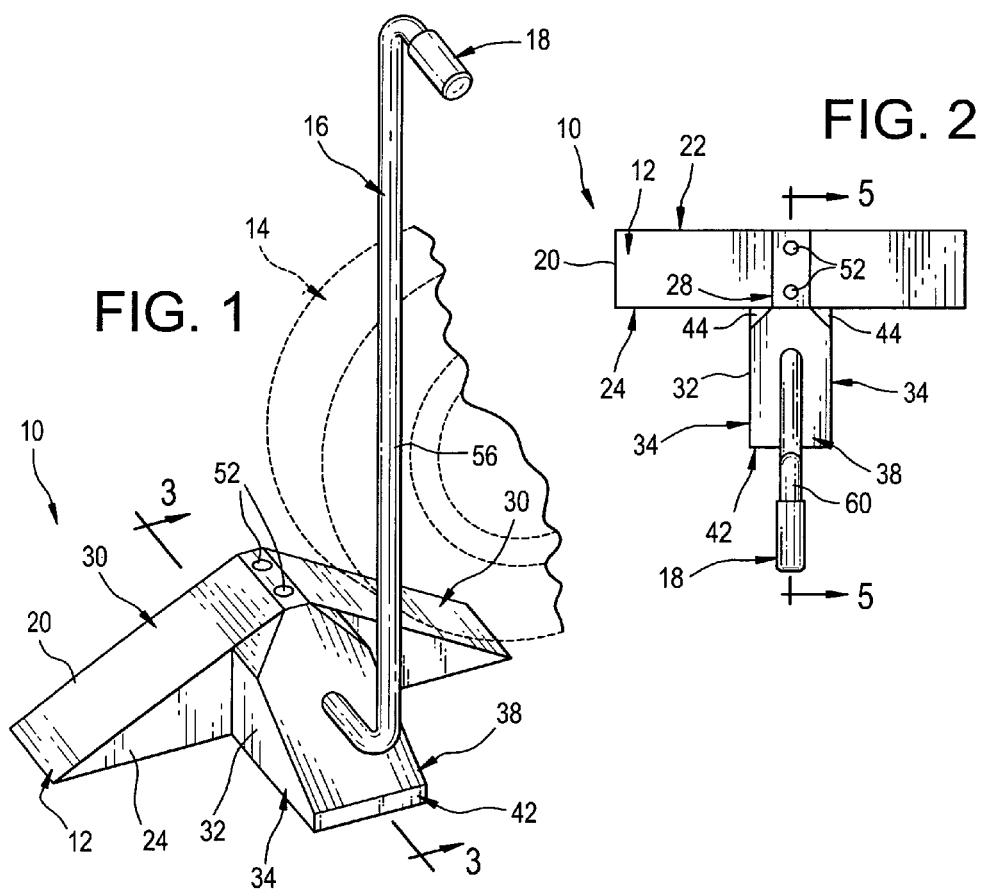
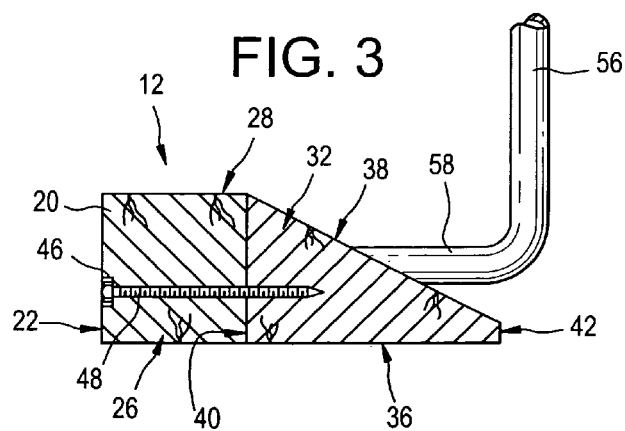

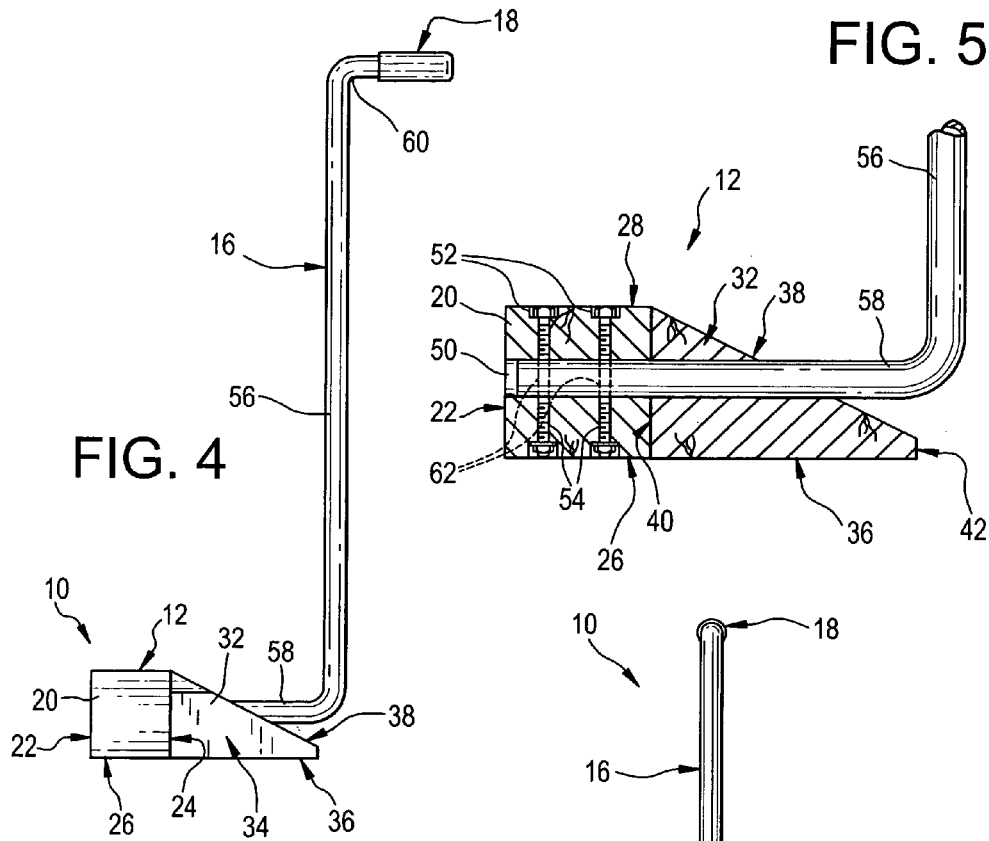

WHEEL CHOCK

CONTINUING APPLICATION DATA

This application is a continuation of U.S. patent application Ser. No. 11/797,920, filed on May 9, 2007, now abandoned.

FIELD OF THE INVENTION

The present invention relates generally to brakes and, more particularly, to devices positioned on the ground for preventing the rolling of a vehicle wheel.

BACKGROUND OF THE INVENTION

Most states require that truck drivers use wheel chocks to prevent their vehicles from rolling during loading and unloading operations. Wheel chocks are triangular in cross section, often looking like miniature skateboard ramps, so as to be easily wedged under vehicle wheels. For maximum durability and grip upon a rolling surface, wheel chocks are made from metal, rubber, plastic, wood, and composites. To prevent their loss, wheel chocks are often brightly colored.

Aside from large trucks, wheel chocks can be beneficially used with cars, RVs, mobile homes, motorcycles, forklifts, and trailers. They provide a measure of safety while, for example, changing oil, fixing a flat tire, or performing other routine, maintenance work. Wheel chocks are light and small, and can be easily carried in vehicles of all sizes.

Using wheel chocks is simple, but not effortless. First, a driver stops his vehicle at a desired location and applies the vehicle's parking brakes. Then, he removes a chock from the storage compartment of the vehicle and slides it along the ground until wedged tightly against a wheel. After work is performed in, or around, the vehicle, a driver disengages the chock from the wheel by moving his vehicle forward few inches. The disengaged chock is, then, picked up and placed back in its storage compartment for reuse at a later time.

Some wheel chocks have been modified to reduce the amount of stooping required to use them. Some chocks, such as those typically seen at airports beneath jetliners, are provided with cords that can be pulled to free the chocks from wheels. Other chocks have been provided with elongated handles that serve a secondary purpose as markers of their presence. Unfortunately, these handled chocks have not seen widespread use since they have been prone to tip over and difficult to engage with more than one side of a vehicle wheel.

SUMMARY OF THE INVENTION

In light of the problems associated with the known wheel chocks, it is a principal object of the invention to provide a wheel chock that features a handle and is tip resistant and is easily engaged with either side of a vehicle wheel. My wheel chock not only saves time and energy but prevents repetitive stress injuries to the backs of drivers who deploy wheels chocks many times during a workday.

It is an object of the invention to provide improved features and arrangements thereof in a wheel chock for the purposes described that is lightweight in construction, inexpensive to manufacture, and dependable in use.

Briefly, the wheel chock in accordance with this invention achieves the intended objects by featuring a head for engagement with a vehicle wheel. The head includes a blade defining a pair of conjoined wedges oriented 180° apart with the wedges having a common, planar base. A hosel is affixed to the middle of the blade and extends upwardly therefrom. The hosel has a planar base that is coplanar with the base of the blade. The hosel tapers in thickness from its connection to the blade to a free end remote from the blade. A handle is affixed to the hosel and extends upwardly therefrom.

The foregoing and other objects, features, and advantages of my wheel chock will become readily apparent upon review of the following detailed description of my wheel chock as illustrated in the accompanying drawings.

BRIEF DESCRIPTION OF THE DRAWINGS

The present invention may be more readily described with reference to the accompanying drawings, in which:

FIG. 1 is a perspective view of a wheel chock constructed in accordance with the present invention.

FIG. 2 is a top view of the wheel chock of FIG. 1.

FIG. 3 is a cross-sectional view taken along line 3-3 of FIG. 1.

FIG. 4 is a right side view of the wheel chock.

FIG. 5 is a cross-sectional view taken along line 5-5 of FIG. 2.

FIG. 6 is a front view of the wheel chock.

Similar reference characters denote corresponding features consistently throughout the accompanying drawings.

DETAILED DESCRIPTION OF THE INVENTION

Referring now to the FIGS., a wheel chock in accordance with the present invention is shown at 10. Chock 10 includes a head 12 for engagement with a vehicle wheel 14 and a handle 16 that extends upwardly from head 12. A handgrip 18 is affixed to the top of handle 16 so that chock 10 can be comfortably moved around by a user.

Head 12 has a blade 20, cut from a single block of wood, which tapers in thickness from its center to its opposed ends and has six faces. The vertical, front face 22 and the vertical, back face 24 of blade 20 are similar trapezoids with their top and bottom edges being parallel and their side edges sloping inwardly towards one another from their bottom edges at angles of about 16°. A horizontal, rectangular base 26 connects the bottoms of front face 22 and back face 24 together whereas a horizontal, top face 28 connects the tops of front face 22 and back face 24 together. Sloping, side faces 30 connect the adjacent sides of front face 22 and back face 24 together. Thus, blade 20 defines a pair of conjoined wedges, oriented 180° apart, that can be easily positioned beneath wheel 14 from either the left or the right.

Head 12 includes a hosel 32 that is affixed to the center of blade 20 in a T-shaped configuration. Like blade 20, hosel 32 is cut from a single block of wood and has six, principal faces. The right and left faces 34 of hosel 32 are similar trapezoids with: their front and back edges being vertical, their bottom edges being horizontal, and their top edges sloping upwardly and forwardly from their back edges at angles of about 16°. A rectangular base 36 connects the bottom edges of right and left faces 34 together, is coplanar with base 26 of blade 20, and is about one-half the length of base 26. A top face 38 abuts top face 28 of blade 20 and connects the top edges of right and left faces 34 together. A front face 40 connects the front edges of right and left faces 34 together and abuts the center of back face 24 of blade 20. A back face 42, however, connects the back edges of right and left faces 34 together. Thus, hosel 32 defines a wedge that is as tall as blade 20 and that is about one-half the length of blade 20 and that extends rearwardly from the center of blade 20 so as to prevent blade 20 from tipping.

To provide a smooth fit between hosel 32 to blade 20, a portion of hosel 32 is cut away so as to provide a pair of transition faces 44 atop hosel 32. Transition faces 44 are triangular in outline and each is bordered by top face 38, front face 40, and one of left and right faces 34. Each of transition faces 44 is parallel to a respective one of side faces 30 of blade 20.

Hosel 32 is permanently affixed to blade 20. To this end, a layer of glue (not shown) is applied to front face 40 of hosel 32 to adhere hosel 32 to blade 20. Furthermore, a pair of countersunk bores 46 is drilled horizontally through blade 20 into the center of hosel 32. Into bores 46 are screwed threaded fasteners 48 so as to reinforce the adhesive qualities of the glue located between hosel 32 and blade 20.

A horizontal aperture 50 passes through blade 20 and hosel 32 between bores 46 for receiving handle 16. As shown, aperture 50 is larger in diameter than bores 46 and penetrates front face 22 of blade 20 and top face 38 of hosel 32. For optimum strength and balance, aperture 50 is positioned midway between the opposite ends of blade 20 and the faces 34 of hosel 32.

A pair of vertical holes 52 extends through blade 20 and intersects aperture 50. Holes 52 are spaced apart and countersunk at both of their respective ends to accommodate threaded fasteners 54 employed to secure handle 16 to head 12. Threaded fasteners 54 comprise matching nuts and bolts.

An S-shaped handle 16 connects head 12 to handgrip 18. Handle 16 has an elongated shank 56 with a connecting portion 58 extending forwardly from the bottom thereof and a gripping portion 60 extending rearwardly from the top thereof. When connecting portion 58 is fitted snugly into aperture 50 via hosel 32, a pair of vertical openings 62 provided therein register with holes 52 so that threaded fasteners 54 can penetrate handle 16 and secure such to head 12. Shank 56 extends vertically upward from connecting portion 58 to waist height for a user. Gripping portion 60 extends horizontally for a distance sufficient to be easily grasped in the hand of a user. The exact dimensions of handle 16 as well as head 12 are largely a matter of design choice.

Handle 16 is made from metal tubing bent to shape for strength and durability. If desired, however, handle 16 could be formed, by way of example only, from wood, plastic, or carbon-fiber composite. The latter alternatives have the advantage of being lighter than metal, but such tend to be more expensive.

Handgrip 18 is important because it connects chock 10 to the hand of a user. Handgrip 18 is made of rubber and is shown to be round, without bumps or hollows to accommodate the fingers of a user. Although not shown for the sake of drawing convenience, handgrip 18 has an assortment of small holes and grooves that make it easier for the user to hold onto chock 10 especially in cold or rainy weather. There are, however, various types of grips known in the art that could be substituted for handgrip 18 to accommodate different hand sizes and gripping styles. I believe that the ideal material and design of handgrip 18 are a matter of personal preference.

It is a straightforward matter to use wheel chock 10 to prevent a parked vehicle bearing wheel 14 from rolling down a hill. First, handgrip 18 is grasped in the hand of a user to remove chock 10 from storage in the trunk or storage compartment of the vehicle. Then, handgrip 18 is elevated so that head 12 hangs like a pendulum from handle 16 and chock 10 is carried to wheel 14. Next, with handgrip 18 still in hand, blade 20 is positioned against the downhill side of wheel 14. Now, a light kick to hosel 32 firmly sets blade 20 in place against wheel 14. When handgrip 18 is released, wheel 14 is effectively prevented from turning. The forward projections of connecting portion 58 and gripping portion 60 of handle 16 make it easy to set blade 20 beneath wheel 14. Of course, the extended length of shank 56 ensures that a user need not bend over or kneel to position blade 20. The low center of gravity and large footprint of head 12 afforded by the tapering of blade 20 and hosel 32 ensures that wind will not blow chock 10 over after it is set in place.

Chock 10 is simply disengaged from wheel 14. To accomplish this task, a user need only grasp and lightly pull handgrip 18 so that blade 20 moves uphill, away from wheel 14. With chock 10 free of wheel 14, chock 10 can be returned to a convenient storage location within a vehicle or it can be positioned elsewhere. The process of disengaging chock 10 from wheel 14, like the process of engaging chock 10 with wheel 14, requires just a few seconds to complete.

While wheel chock 10 has been described with a high degree of particularity, it will be appreciated by those skilled in the art that modifications can be made to it. For example, head 12, handle 16, or handgrip 18 can be painted or otherwise provided with a high-visibility color to visually alert a user that chock 10 is deployed prior to moving wheel 14. Therefore, it is to be understood that the present invention is not limited solely to wheel chock 10 described above, but encompasses any and all wheel chocks within the scope of the following claims.

I claim:

1. A wheel chock, comprising:
    a head for engagement with a vehicle wheel, said head including:
        a blade having a pair of conjoined, first wedges oriented 180° apart; each of said first wedges having a first planar base surface at the bottom thereof parallel to the ground for flush positioning against the ground; and said first planar base surfaces; being coplanar with one another;
        a hosel being affixed to, and extending at right angles from, the middle of said blade; said hosel being a second wedge with a planar second base surface at the bottom thereof; said second, base surface being coplanar with said first planar base surfaces of said blade; and said second wedge tapering in thickness from its connection to said blade to a free end remote from said blade such that said second wedge is provided with a top face that slopes downwardly and away from said blade; and,
    a handle being affixed to, and extending upwardly from, said top face of said hosel.

* * * * *